US011869361B2

(12) United States Patent
Plascencia-Vega et al.

(10) Patent No.: US 11,869,361 B2
(45) Date of Patent: Jan. 9, 2024

(54) COORDINATED MULTI-VEHICLE ROUTING

(71) Applicant: GM Cruise Holdings LLC, San Francisco, CA (US)

(72) Inventors: Diego Plascencia-Vega, San Francisco, CA (US); Dogan Gidon, San Francisco, CA (US); Nestor Grace, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 84 days.

(21) Appl. No.: 17/220,138

(22) Filed: Apr. 1, 2021

(65) Prior Publication Data

US 2022/0319337 A1 Oct. 6, 2022

(51) Int. Cl.
*G08G 1/00* (2006.01)
*G08G 1/0968* (2006.01)

(52) U.S. Cl.
CPC ......... *G08G 1/22* (2013.01); *G08G 1/096811* (2013.01); *G08G 1/202* (2013.01)

(58) Field of Classification Search
CPC ..... G08G 1/22; G08G 1/096811; G08G 1/202
See application file for complete search history.

(56) References Cited

U.S. PATENT DOCUMENTS 8,417,860 B2 * 4/2013 Choi ....................... H04L 67/12 710/100
9,725,083 B2 * 8/2017 Dextreit ................ B60W 10/06
10,353,387 B2 * 7/2019 Stenneth .......... G06Q 10/06315
2002/0133285 A1 * 9/2002 Hirasago ................ B60K 35/00 701/96
2007/0030212 A1 * 2/2007 Shibata ..................... G06T 5/50 345/9
2007/0115138 A1 * 5/2007 Arakawa ................... B60R 1/00 348/148
2008/0167774 A1 * 7/2008 Patel ........................ G08G 1/20 701/1
2010/0114541 A1 * 5/2010 Johnson ................. G06N 5/003 703/2
2013/0080041 A1 * 3/2013 Kumabe ................ G05D 1/024 701/117
2013/0235169 A1 * 9/2013 Kato ...................... G02B 30/34 348/53
2014/0236414 A1 * 8/2014 Droz ...................... G08G 1/015 701/1
2015/0291160 A1 * 10/2015 Kim ...................... B60W 30/16 345/633

(Continued)

*Primary Examiner* — Hussein Elchanti
(74) *Attorney, Agent, or Firm* — Novak Druce Carroll LLP

(57) ABSTRACT

The disclosed technology provides solutions for improving the operational efficiency and safety of autonomous vehicles (AVs). In some implementations, the disclosed technology encompasses methods for performing vehicle clustering or platooning, for example, that can include steps for computing navigation routes for each of a plurality of autonomous vehicles (AVs), identifying a route overlap for a first AV and a second AV selected from among the plurality of AVs, and transmitting a clustering instruction to the first AV and the second AV based on the route overlap, wherein the clustering instruction is configured to cause the first AV and the second AV to initiate a clustering configuration. Systems and machine-readable media are also provided.

20 Claims, 8 Drawing Sheets

(56) References Cited

U.S. PATENT DOCUMENTS

| | | | | |
|---|---|---|---|---|
| 2016/0170487 | A1* | 6/2016 | Saisho | B60K 35/00<br>345/156 |
| 2016/0240085 | A1* | 8/2016 | Otsuka | H04N 13/239 |
| 2017/0036601 | A1* | 2/2017 | Kimura | B60R 1/00 |
| 2017/0305365 | A1* | 10/2017 | Matsumoto | B60K 37/06 |
| 2018/0120861 | A1* | 5/2018 | Saxena | G05D 1/0295 |
| 2019/0044728 | A1* | 2/2019 | Karmoose | H04L 9/0643 |
| 2019/0349719 | A1* | 11/2019 | Pattan | H04W 4/08 |
| 2019/0378418 | A1* | 12/2019 | Menadue | H04W 4/46 |
| 2020/0186290 | A1* | 6/2020 | Zhang | H04L 1/0031 |
| 2020/0249699 | A1* | 8/2020 | Kim | G05D 1/0295 |
| 2021/0264793 | A1* | 8/2021 | Shuman | H04W 4/023 |
| 2021/0350707 | A1* | 11/2021 | Ucar | H04W 4/021 |
| 2022/0061068 | A1* | 2/2022 | Liu | H04W 12/76 |
| 2022/0104200 | A1* | 3/2022 | Zang | H04W 48/12 |

* cited by examiner

COORDINATED MULTI-VEHICLE ROUTING

BACKGROUND

1. Technical Field

The subject technology relates to solutions for improving the operational efficiency and safety of autonomous vehicles (AVs) and in particular, for improving energy efficiency and safety by providing solutions for vehicle clustering or platooning.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. Where multiple AVs are involved, as in AV fleet deployments, improvements in vehicle operation and safety may increasingly depend on coordination of navigation and sensory tasks between fleet vehicles.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
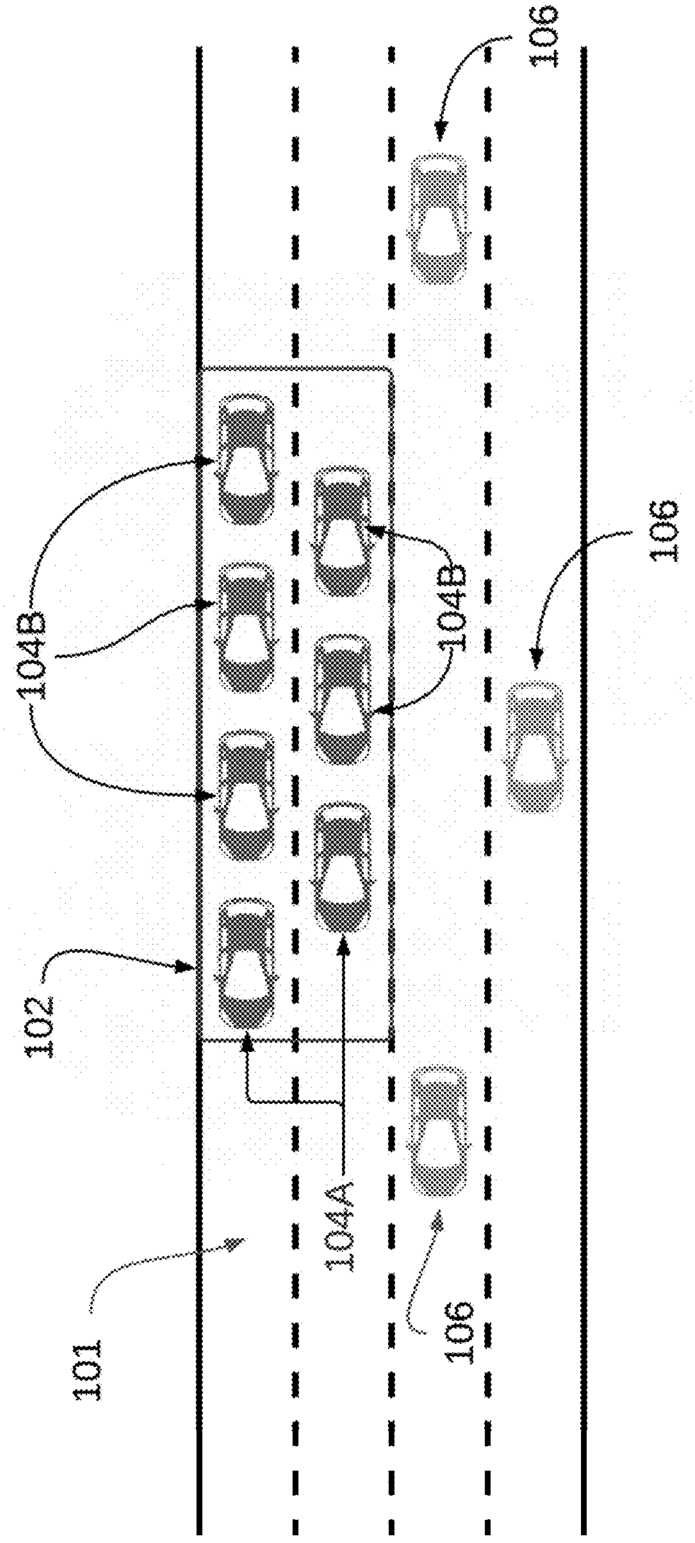
FIG. 1 illustrates an example environment in which AV clustering (or platooning) can be implemented, according to some aspects of the disclosed technology.

The detailed description set forth below is intended as a description of various configurations of the subject technology but is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

When multiple vehicles share overlapping routes, the formation of closely spaced vehicle clusters (also: platoon or train) can improve fuel economy. Where autonomous vehicles (AVs) are concerned, a number of additional benefits can be realized by clustering. In addition to improving aerodynamic performance, AV clustering can promote greater energy efficiency by enabling the distribution of certain AV computational tasks (e.g., perception and/or planning processes) between cluster members. As such, average energy demands of cluster vehicles can be reduced by sharing or distributing energy-consuming processes. Additionally, by closely spacing clustered vehicle members, clustering can also decrease a number of interactions with non-cluster vehicles, for example, that may result in rapid acceleration/deceleration. Such decreases can thereby provide additional improvements to overall energy economy, as well as to improvements in rider/user experience, e.g., by enhancing driving 'smoothness.'

Aspects of the disclosed technology provide solutions for realizing the foregoing advantages vehicle clustering in the context of AV fleet operations. In some aspects, the disclosed technology provides a fleet management system configured to identify clustering opportunities, and for facilitating the formation and dissolution of AV clusters/platoons. The disclosed fleet management system can be configured to analyze individual AV routes, and to identify clustering opportunities based on route overlap. In some implementations, fleet coordination operations may utilize predictive analytics, for example, to predict overlapping AV routes based on historic fleet navigation patterns. As discussed in further detail below, the fleet management system can also be configured to make clustering/de-clustering decisions based on information gathered by one or more AVs, for example, regarding road conditions and/or AV intent, etc.

FIG. 1 illustrates an example environment 100 in which AV clustering (or platooning) can be implemented. In environment 100, a road segment 101 is illustrated with an AV cluster/platoon 102 comprised of multiple vehicles (104A and 104B, collectively 104). Road segment 101 can represent any segment of roadway, e.g., highway, roadway or thoroughfare, upon which various vehicles (e.g., AVs 104) may travel to reach their intended destinations. By way of example, road segment 101 can represent a portion of a freeway upon which commuters may frequently travel using an AV ride-sharing or ride-hailing service. The AV cluster 102 shown in the example of FIG. 1 contains seven vehicles, however it is understood that AV clusters can have a greater (or fewer) number of vehicles, without departing from the scope of the technology. By way of example, AV cluster 102 may contain two AVs, or may contain fifteen AVs, without departing from the scope of the technology.

Clustering can improve the aggregate efficiency and safety of participating AVs. For example, one or more of clustered vehicles 104 can realize aerodynamic improvements by following behind a lead vehicle, thereby reducing the total or average energy/fuel expenditure of the vehicle cluster 102. In the illustrated examples, some or all of AVs 104B may benefit from a reduced wind resistance by following lead/edge AVs 104A.

Clustering can improve the aggregate computing efficiency of participating AVs. In some aspects, AV processing tasks can be divided and/or shared between computing systems of different platooning vehicles in cluster 102. In the example of environment 100, designated edge-vehicles 104A can provide all or a portion of perception and planning functions required by one or more other vehicles (e.g., AVs 104B) within cluster 102. In some implementations, edge vehicles may also perform other designated functions on behalf of other platooning vehicles. For example, leading edge vehicles may be tasked with greater responsibility for executing emergency braking operations or communicating detected conditions to other vehicles in the platoon.

In some approaches, edge-vehicle designations and processing responsibilities can be planned by a fleet coordinator or fleet management system, for example, based on perceived traffic dynamics, such as based on the position and/or behavior of non-cluster vehicles 106. Edge vehicle designations may also be determined on an ad hoc basis, for example, based on negotiation/consensus process performed between one or more vehicles comprising AV cluster 102. Irrespective of the coordinating entity, edge vehicles 104A may be designated based on their location within cluster 102 upon cluster formation. Additionally, vehicles 104A be designated as edge vehicles based on their sensor and/or computing abilities; for example, AVs with better or more capable sensing capabilities may be designated as edge vehicles 104A, and thereby provisioned with some or all of the perception and/or planning functions required by one or more other vehicles (e.g., AVs 104B). In other aspects, edge vehicle designation may be based on route planning, for example, whereby vehicles leaving cluster 102 to follow alternative navigation routes may not (or may be less likely to be) designated as edge vehicles. In other some aspects, edge vehicle designations may be performed on an ad hoc basis, for example, based on individual vehicle routing and/or navigation goals, and/or environmental perceptions. In some aspects, edge vehicle designations can depend on how long a given vehicle is to remain in the platoon. For example, vehicles traveling further distances in a platoon formation may be prioritized as edge vehicles. Similarly, vehicles predicted to remain in the platoon for shorter durations (e.g., based on their routing intent) may be less likely to be designated as edge vehicles, and more likely to be placed in a rearward location in the platoon formation. In this way, edge-vehicle and platoon-position designations can reduce the frequency of edge vehicle re-assignment, as well as ensure that platoon formations are less affected as vehicles leave or depart the formation.

As discussed in further detail below, the dissolution of clusters (e.g., cluster 102) can also be facilitated by a remote fleet management system, and/or based on a consensus reached by AVs in cluster. In some aspects, behaviors of non-cluster participant vehicles 106 may cause one or more AVs to leave cluster 102, for example, to ensure that safety and/or routing objectives remain uncompromised. For example, one or more of clustering AVs 104 may become detached or separated from cluster 102 if a non-cluster participant 106 interferes with the traffic flow of cluster 102 and the detachment of one or more vehicles 104 is necessary to ensure safety and/or navigation efficiency.

Figure 2A:
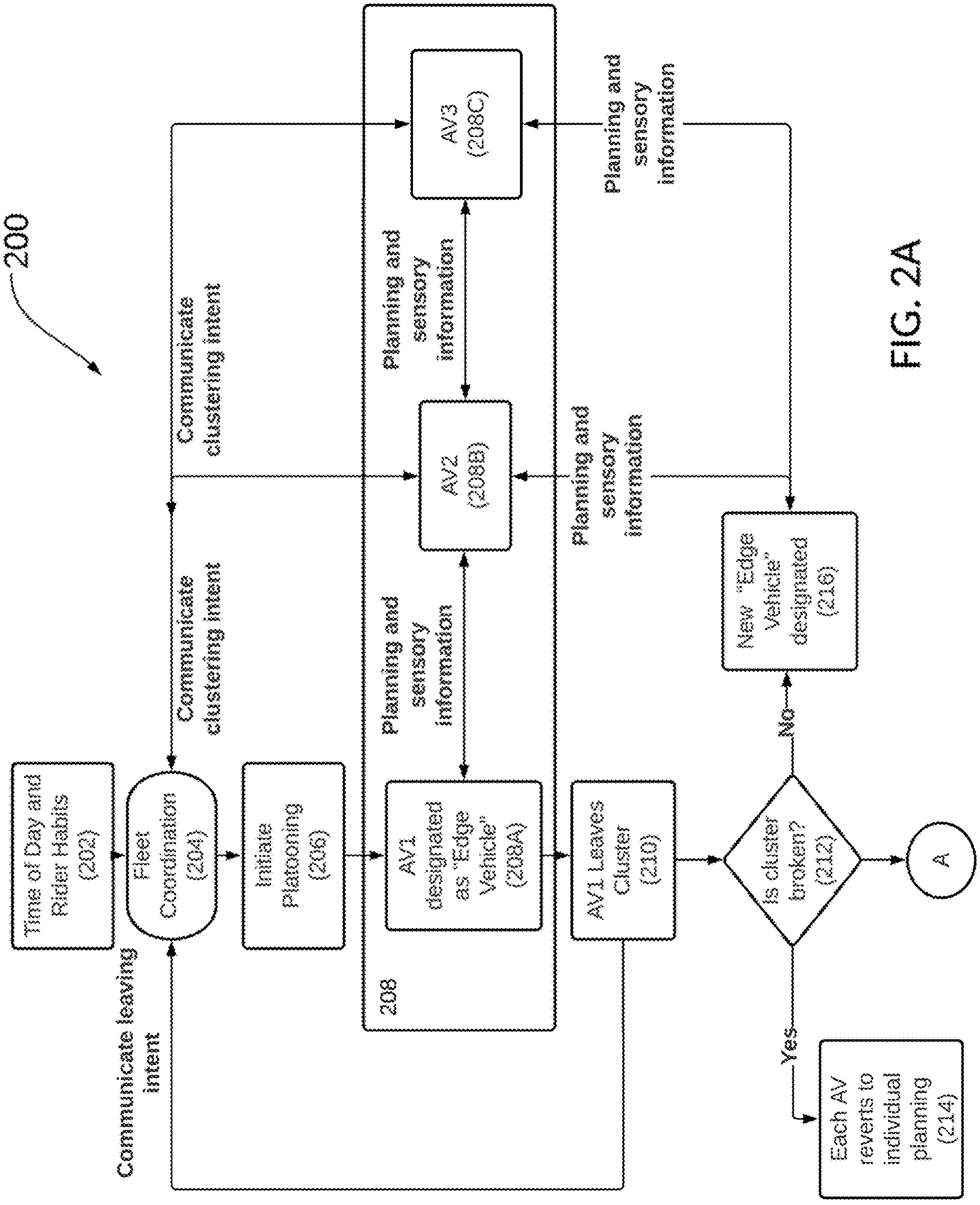
FIGS. 2A and 2B illustrate a conceptual block diagram of an example system for implementing AV platooning, according to some aspects of the disclosed technology.
Figure 2B:
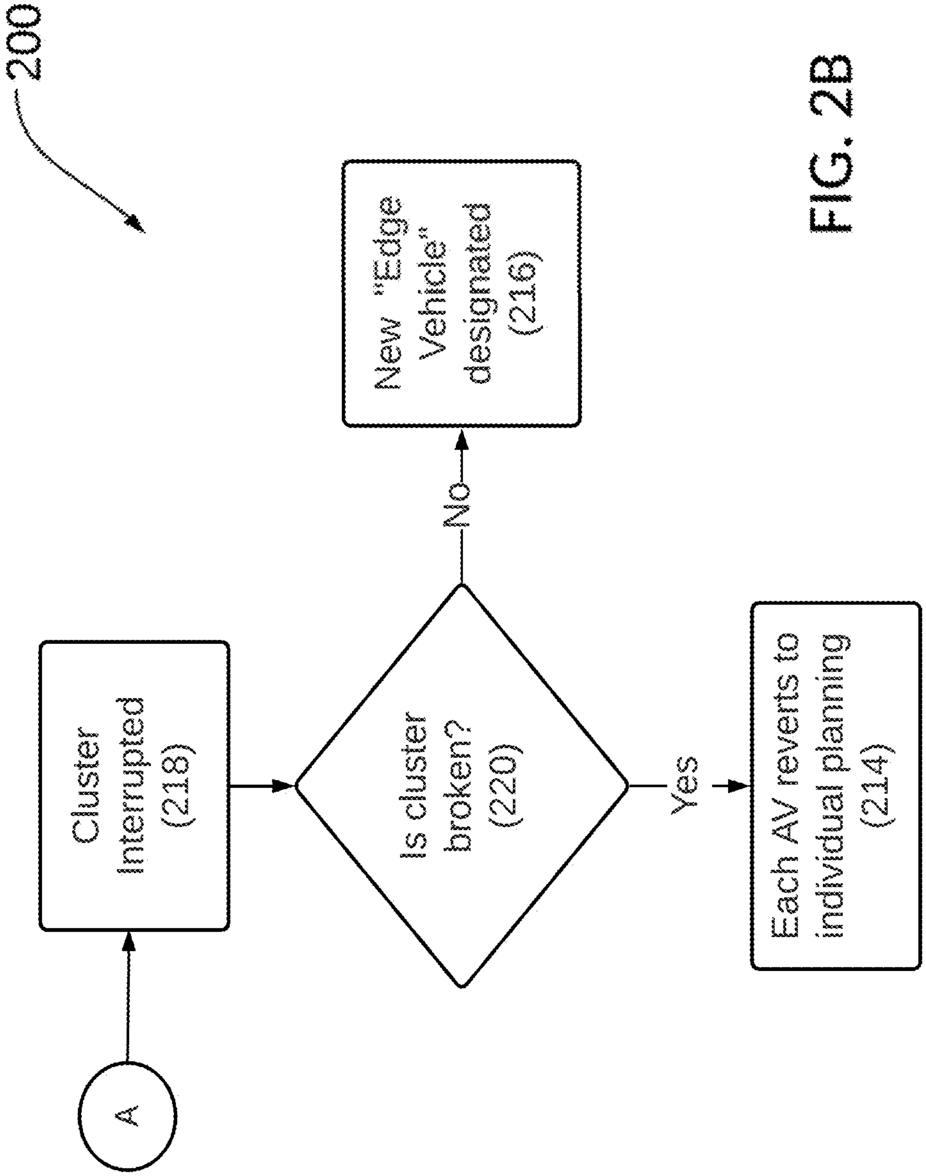

FIGS. 2A-2B conceptually illustrates an example system 200 for coordinating AV platooning, according to some aspects of the disclosed technology. At block 202 rider/user driving habits are collected for analysis by a fleet coordination system (block 204). The driving habits can include historic ride data associated with various user profiles of a ride hailing system. By way of example, the historic ride data can include pick-up location information, drop-off location information, route information, and/or timestamp information for various rides taken by one or more users (e.g., departure time information). The historic ride data can be used by a fleet coordination system to identify current or future times for which AV platooning/clustering may be implemented.

At block 206, the fleet coordination system identifies one or more AV platooning candidates, for example, based on similarities (overlaps) in routes taken between pick-up and drop-off destinations. By way of example, if two or more AVs are identified by the coordination system to be proximately located on a similar roadway, and traveling in the same direction, then the fleet coordination system can generate and send commands necessary to initiate platooning (block 206). As illustrated in the example of FIG. 2A, fleet coordination activities can also take into account the clustering intent of individual AVs 208 (e.g., AV1 208A, AV2 208B, and AV3 208C). For example, planning and sensory information generated/gathered by each AV can be used by the fleet coordination system to determine if and when platooning can be safely and efficiently executed. Depending on the desired implementation, portions of the platoon coordination process may be performed on or at individual AVs, and/or shared with the fleet coordination system. Additional aspects relating to platooning/clustering operations are discussed in further detail with respect to FIGS. 3A and 3B, below.

Platoon dissolutions and/or individual vehicle departures can be similarly managed by the fleet coordination system and/or individual AVs. For example, if an AV (e.g., AV1) departs from the cluster (block) 210, the departure intent is communicated to the fleet coordination system (block 204), and determinations are made as to whether the cluster/platoon is broken (block 212). If it is determined that the cluster is broken, each individual AV can revert to performing its own respective perception and planning functions (block 214). Alternatively, if the cluster is unbroken, then one or more new edge vehicles may be designated for the remaining AVs (block 216). Additional cluster dissolution implementations are described with respect to FIG. 2B.

Specifically, FIG. 2B illustrates a contingency in which the AV cluster is interrupted, for example, by a non-cluster traffic participant, such as another roadway vehicle. Such interruptions may occur if non-cluster vehicles maneuver into position between AV cluster participants. In such circumstances, an additional determination is made as to whether the cluster is broken (block 220). Again, if it is determined that the cluster has been broken, then each individual AV resumes its respective perception and planning functions (block 214). Alternatively, if it determined that the cluster remains unbroken, then one or more new edge vehicles may be designated (block 216). By way of example, a non-cluster traffic participant may maneuver between AVs in a given cluster. In response, the cluster may be reconfigured, for example, such that there are effectively two or more new clusters formed, i.e., that share routing, perception, and/or planning functions. In such cases, new edge vehicles can be designated based on dynamic changes to the cluster configurations, for example, that may be based on relative, vehicle positions, capabilities, and/or navigation plans, etc.

Figure 3A:
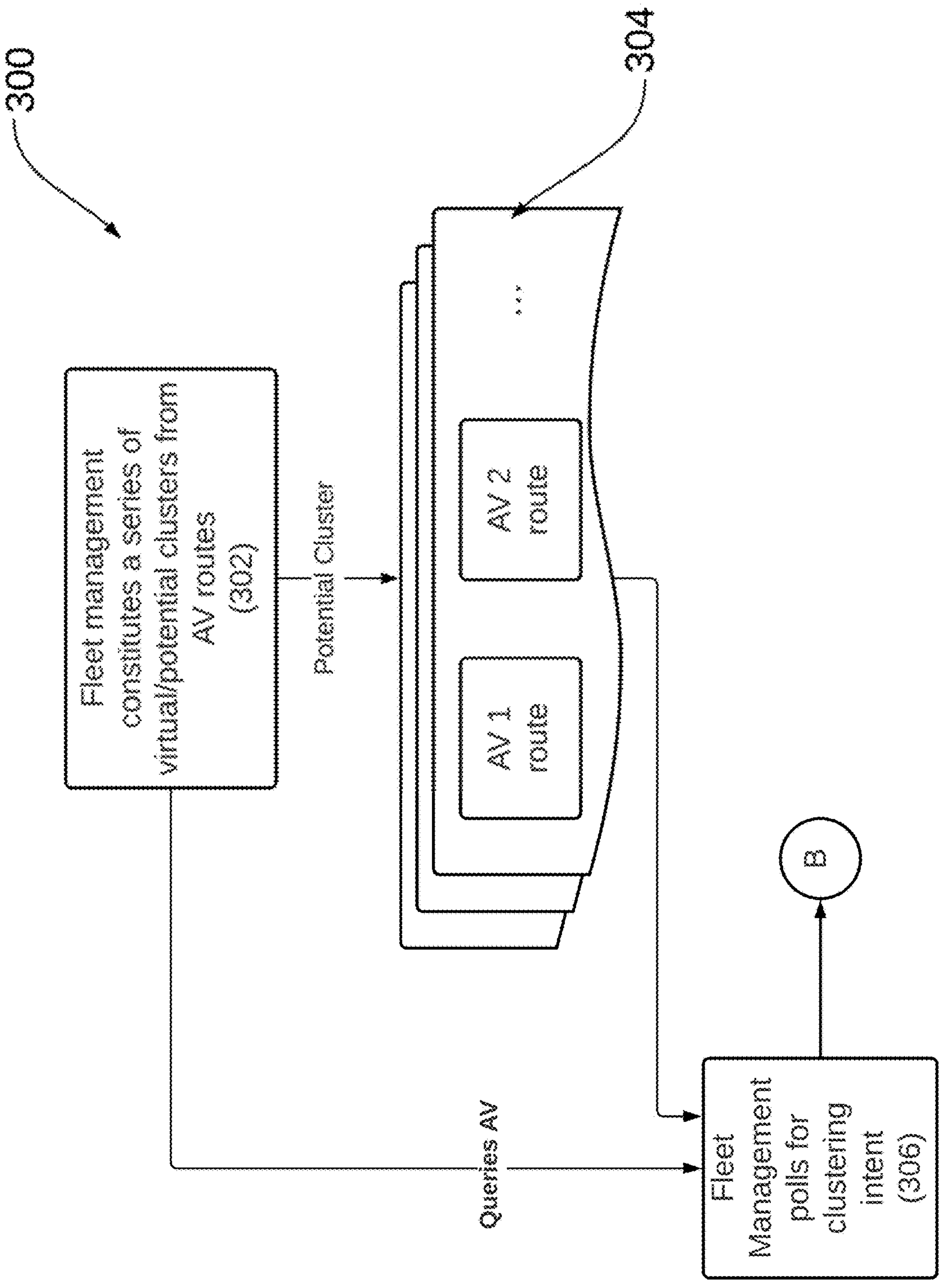
FIGS. 3A and 3B illustrate steps of a process for AV platooning, according to some aspects of the disclosed technology.
Figure 3B:
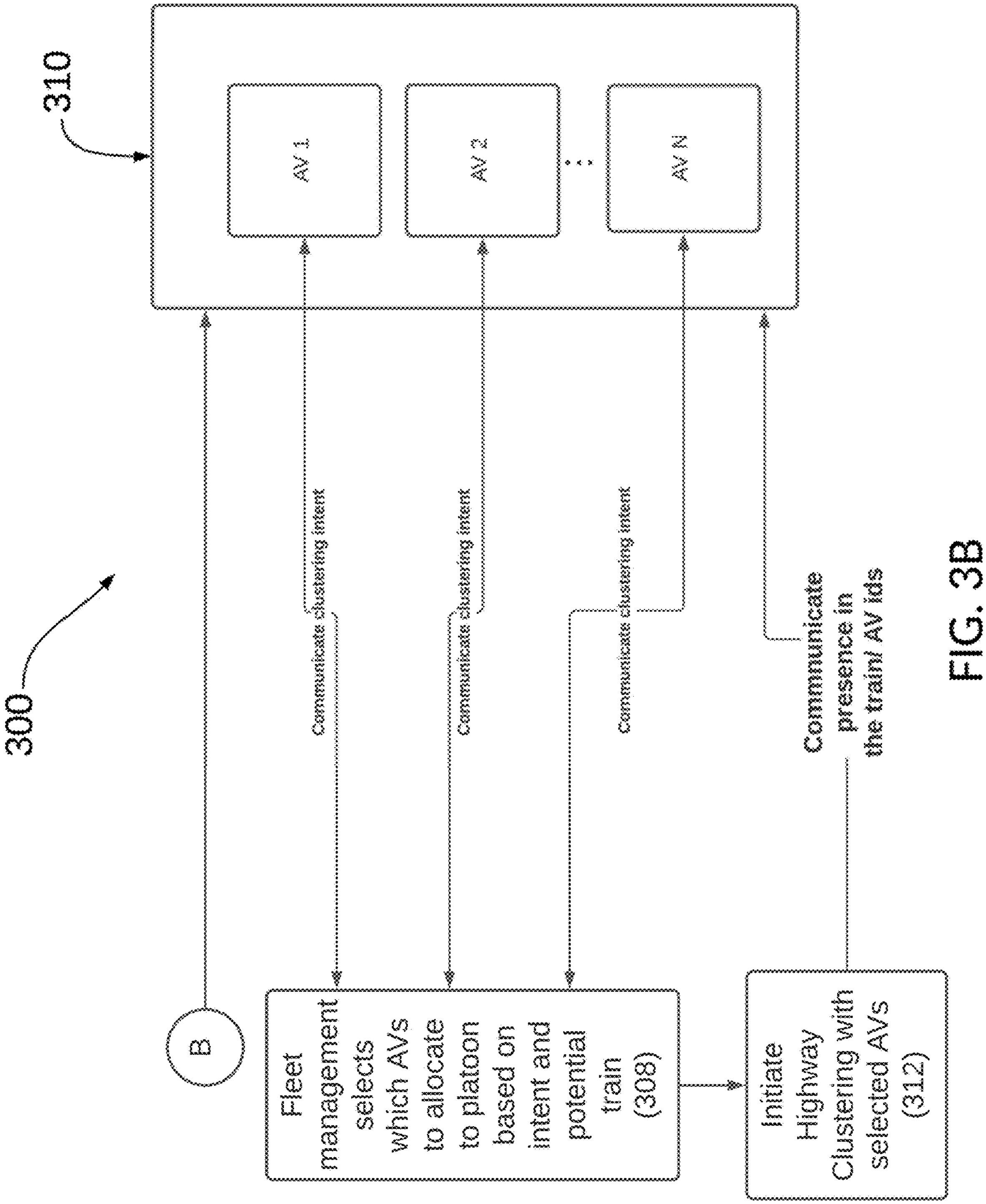

FIGS. 3A-B illustrates steps of a process 300 for implementing an AV platooning process, according to some aspects of the disclosed technology. Process 300 begins with step 302 in which one or more virtual/potential AV clusters are determined (predicted) based on historic AV route data. Potential AV clusters may be calculated/predicted (e.g., by a fleet management system) based on historic ride patterns associated with various map regions and/or ride service users (block 304). For example, if AV routing patterns indicate that multiple AVs are likely to be traveling along a common route the same time (or approximately the same time), potential AV clusters can be computed to provide associations between two or more AV members of the potential cluster/platoon.

Pre-calculating cluster potentials can help prepare the fleet management system to perform tasks necessary to assemble AV clusters/platoons. By way of example, pre-calculations of AV clusters can be used to help geographically disperse AVs in a manner that will facilitate ride pick-up and platooning.

In some aspects, AV cluster determinations can be based on rider pick-up and drop-off schedules. For example, schedules can represent rider pre-commitments to an AV ride-hailing service for pick-up and drop-off service at certain times and locations. By way of example, rider schedules can correspond with individual rider commuting needs and provided as part of a subscription transportation service.

Subsequently, the fleet management system can poll individual AVs for clustering intent (block 306). As illustrated, polling can also be performed based on the pre-calculated clusters (block 304). For example, specific AVs associated with a predicted AV cluster may be polled more frequently, or may be polled more (or less) frequently at specific times based on historic routing data and/or the location/navigational operations of the specific AV.

Process 300 continues to FIG. 3B, where clustering intent is used by the fleet management system to select which AVs to allocate to a given platoon (308), and the clustering intent is communicated from the fleet management system to two or more AVs (block 310). Clustering commands are then sent to respective AVs to form the intended platoons/clusters (block 312).

Figure 4:
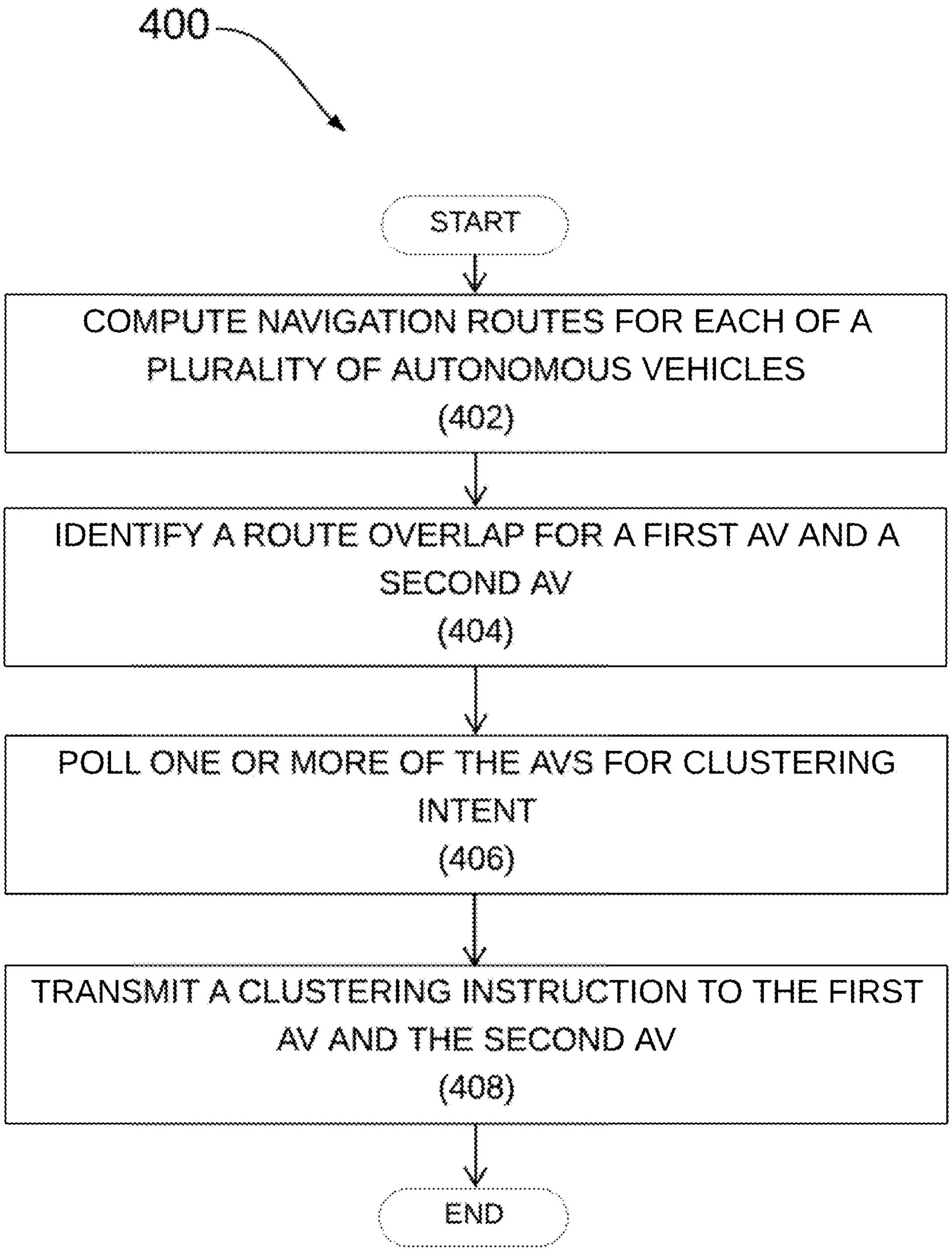
FIG. 4 illustrates steps of a process for coordinating multiple AVs into an AV platoon, according to some aspects of the disclosed technology.

FIG. 4 illustrates steps of a process 400 for coordinating the assembly of an AV platoon, according to some aspects of the disclosed technology. Process 400 begins with step 402 in which navigation routes are computed for each of a plurality of AVs. As discussed above with respect to FIGS. 2A/B, the navigation routes may be computed by a fleet coordination/dispatch system. In some instances, navigation routes may be predicted or pre-computed based on rider habits and/or historic routing data.

At step 404, route overlaps are identified for two or more AVs, such as a first AV and a second AV. It is understood overlapping routes can be identified or determined for any number of AVs, without departing from the scope of the disclosed technology. In some aspects, route overlaps are computed for the purpose of determining potential AV clusters/platoons, as discussed above with respect to FIG. 3A.

In step 406, one or more AVs are polled for clustering intent. Polling can include the collection of perception, navigation, and/or routing information from various AVs, for example, to verify AV intent and clustering ability.

In step 408, clustering instructions are sent to the first AV and the second AV to initiate clustering. As discussed above with respect to FIG. 3B, larger AV clusters may be formed, depending on the desired implementation. The clustering arrangement can be configured to persist for at least a portion of a navigation duration, e.g., until one of the AV departs from the cluster. As discussed above, for example with respect to FIG. 2B, AV departures may not dissolve larger clusters, however, new edge vehicle designations may be determined based on AV additions or departures from a given cluster.

Figure 5:
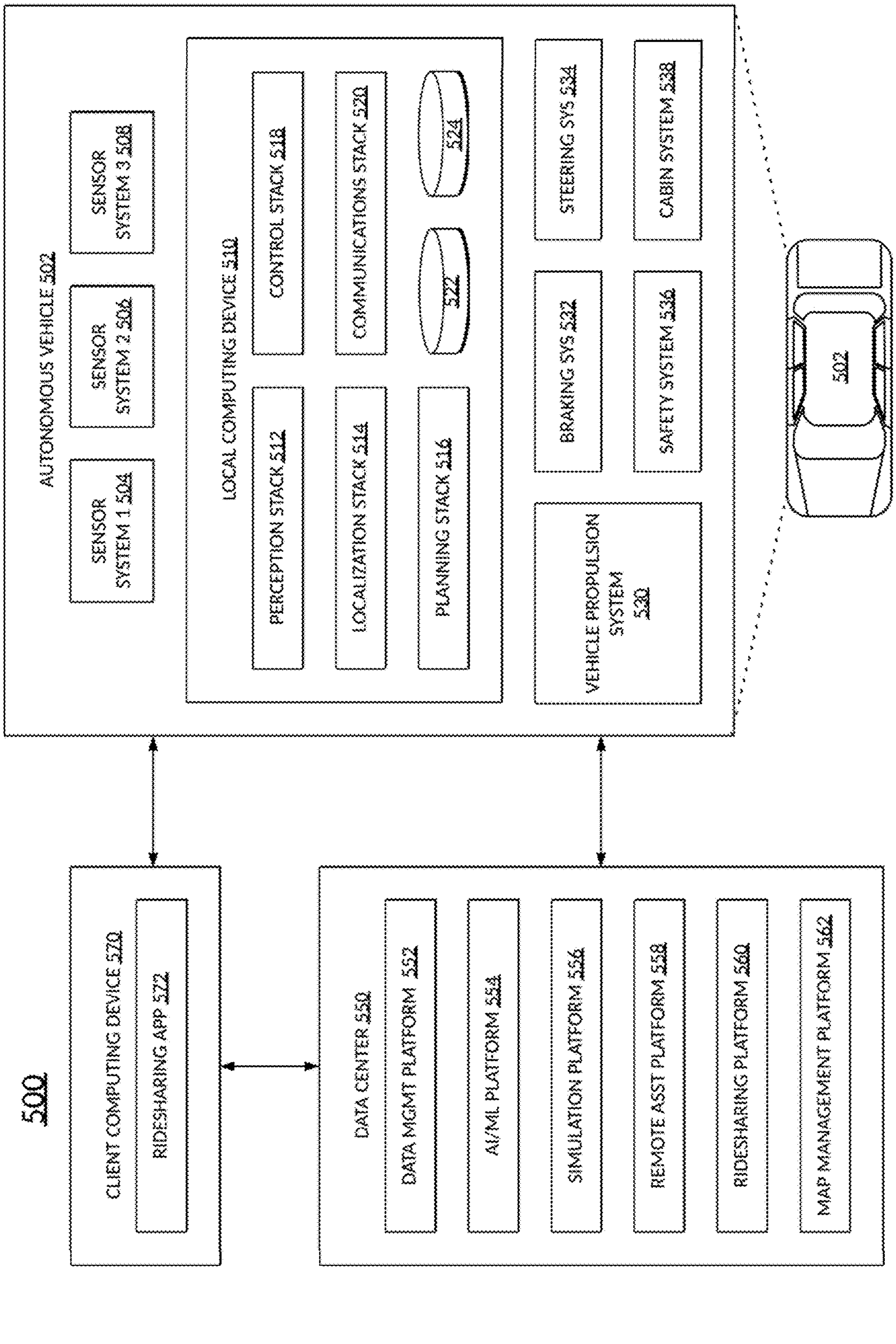
FIG. 5 illustrates an example system environment that can be used to facilitate AV dispatch and operations, according to some aspects of the disclosed technology.

Turning now to FIG. 5 illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, brake pads, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AVs environment; logging metrics collected by the sensor systems 504-508; and so forth. In this example, the local computing device 510 includes a perception stack 512, a mapping and localization stack 514, a planning stack 516, a control stack 518, a communications stack 520, an HD geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth.

Mapping and localization stack 514 can determine the AVs position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AVs steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (5G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image data, RADAR data, GPS data, and other sensor data that the data center 550 can use for creating or updating AV geospatial data as discussed further below with respect to FIG. 2 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, a ridesharing platform 560, and map management system platform 562, among other systems.

Data management platform 552 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management system platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management system platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management system platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management system platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, UAVs, satellites, third-party mapping services, and other sources of geospatially referenced data. The raw data can be processed, and map management system platform 562 can render base representations (e.g., tiles (2D), bounding volumes (3D), etc.) of the AV geospatial data to enable users to view, query, label, edit, and otherwise interact with the data. Map management system platform 562 can manage workflows and tasks for operating on the AV geospatial data. Map management system platform 562 can control access to the AV geospatial data, including granting or limiting access to the AV geospatial data based on user-based, role-based, group-based, task-based, and other attribute-based access control mechanisms. Map management system platform 562 can provide version control for the AV geospatial data, such as to track specific changes that (human or machine) map editors have made to the data and to revert changes when necessary. Map management system platform 562 can administer release management of the AV geospatial data, including distributing suitable iterations of the data to different users, computing devices, AVs, and other consumers of HD maps. Map management system platform 562 can provide analytics regarding the AV geospatial data and related data, such as to generate insights relating to the throughput and quality of mapping tasks.

In some embodiments, the map viewing services of map management system platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
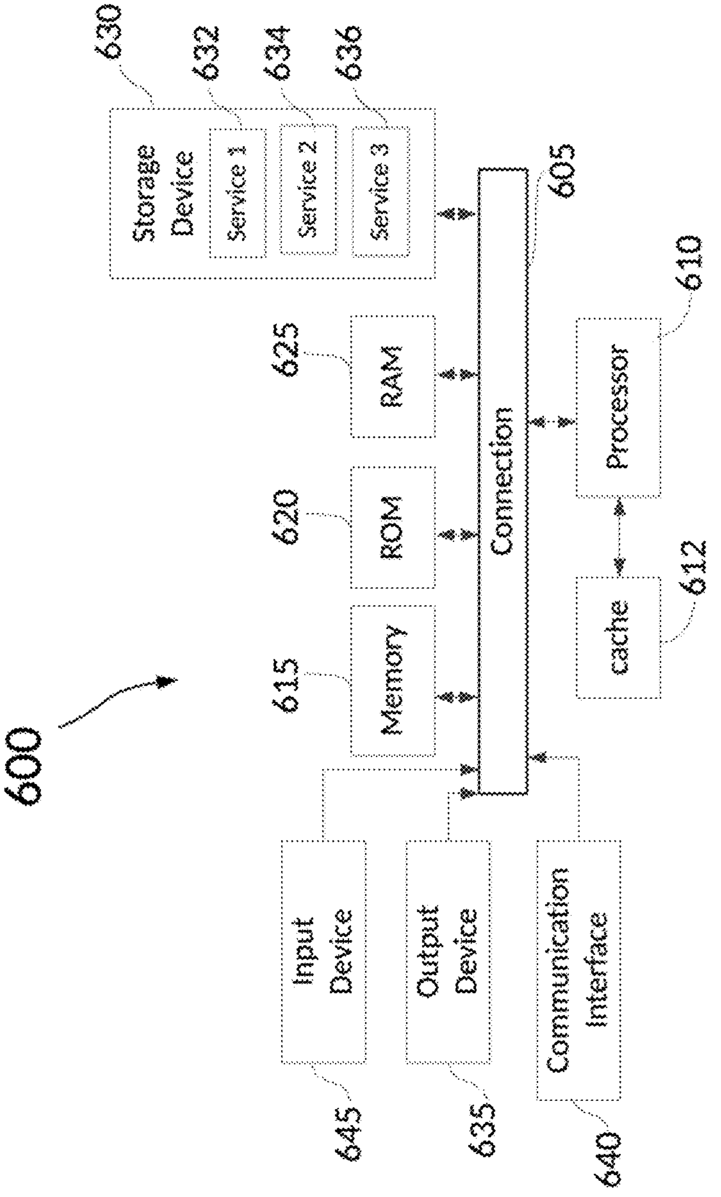
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up internal computing system 610, remote computing system 650, a passenger device executing the rideshare app 670, internal computing device 630, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 510 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A fleet coordination system comprising:

one or more processors; and a computer-readable medium coupled to the one or more processors, wherein the computer-readable medium comprises instructions that are configured to cause the one or more processors to perform operations comprising:

computing navigation routes for each of a plurality of autonomous vehicles (AVs);

identifying a route overlap for a first AV and a second AV selected from among the plurality of AVs;

transmitting a clustering instruction to the first AV and the second AV based on the route overlap, wherein the clustering instruction is configured to cause the first AV and the second AV to initiate a clustering arrangement;

designating the first AV as an edge vehicle based on the first AV's location within the clustering arrangement, wherein designating the first AV as the edge vehicle triggers the first AV to perform all of the perception tasks and all of the planning tasks for both the first AV and the second AV to lower an average energy demand of each of the plurality of AVs within the clustering arrangement;

receiving an instruction that the first AV intends to leave the clustering arrangement;

determining that when the first AV leaves the clustering arrangement, the clustering arrangement will be broken;

triggering, after determining that the clustering arrangement is broken, the first AV to stop performing all of the perception tasks and all of the planning tasks for the second AV; and triggering the second AV to revert to performing all of its own respective perception functions and all of its own planning functions.

2. The fleet coordination system of claim 1, wherein the clustering arrangement is configured to persist for at least a portion of a navigation duration corresponding with the identified route overlap.

3. The fleet coordination system of claim 1, wherein the clustering instruction is further configured to designate the second AV as a lead vehicle.

4. The fleet coordination system of claim 1, wherein the clustering instruction is configured to cause the first AV and the second AV to share planning operations.

5. The fleet coordination system of claim 1, wherein the clustering instruction is based on historic ride data.

6. The fleet coordination system of claim 1, wherein the instructions are further configured to cause the one or more processors to perform operations comprising:

polling one or more of the plurality of autonomous vehicles for a clustering intent, and wherein the clustering instruction is based at least in part on the clustering intent.

7. The fleet coordination system of claim 1, wherein computing the navigation routes for each of the plurality of AVs is based on one or more of: pick-up location information, destination location information, or departure time.

8. A computer-implemented method comprising:

computing navigation routes for each of a plurality of autonomous vehicles (AVs);

identifying a route overlap for a first AV and a second AV selected from among the plurality of AVs;

transmitting a clustering instruction to the first AV and the second AV based on the route overlap, wherein the clustering instruction is configured to cause the first AV and the second AV to initiate a clustering arrangement;

designating the first AV as an edge vehicle based on the first AV's location within the clustering arrangement, wherein designating the first AV as the edge vehicle triggers the first AV to perform all of the perception tasks and all of the planning tasks for both the first AV and the second AV to lower an average energy demand of each of the plurality of AVs within the clustering arrangement;

receiving an instruction that the first AV intends to leave the clustering arrangement;

determining that when the first AV leaves the clustering arrangement, the clustering arrangement will be broken;

triggering, after determining that the clustering arrangement is broken, the first AV to stop performing all of the perception tasks and all of the planning tasks for the second AV; and triggering the second AV to revert to performing all of its own respective perception functions and all of its own planning functions.

9. The computer-implemented method of claim 8, wherein the clustering arrangement is configured to persist for at least a portion of a navigation duration corresponding with the identified route overlap.

10. The computer-implemented method of claim 8, wherein the clustering instruction is further configured to designate the second AV as a lead vehicle.

11. The computer-implemented method of claim 8, wherein the clustering instruction is configured to cause the first AV and the second AV to share planning operations.

12. The computer-implemented method of claim 8, wherein the clustering instruction is based on historic ride data.

13. The computer-implemented method of claim 8, further comprising:

polling one or more of the plurality of autonomous vehicles for a clustering intent, and wherein the clustering instruction is based at least in part on the clustering intent.

14. The computer-implemented method of claim 8, wherein computing the navigation routes for each of the plurality of AVs is based on one or more of: pick-up location information, destination location information, or departure time.

15. A non-transitory computer-readable storage medium comprising instructions stored therein, which when executed by one or more processors, cause the processors to perform operations comprising:

computing navigation routes for each of a plurality of autonomous vehicles (AVs);

identifying a route overlap for a first AV and a second AV selected from among the plurality of AVs;

transmitting a clustering instruction to the first AV and the second AV based on the route overlap, wherein the clustering instruction is configured to cause the first AV and the second AV to initiate a clustering arrangement;

designating the first AV as an edge vehicle based on the first AV's location within the clustering arrangement, wherein designating the first AV as the edge vehicle triggers the first AV to perform perception tasks and planning tasks for both the first AV and the second AV to lower an average energy demand of each of the plurality of AVs within the clustering arrangement;

receiving an instruction that the first AV intends to leave the clustering arrangement;

determining that when the first AV leaves the clustering arrangement, the clustering arrangement will be broken;

triggering, after determining that the clustering arrangement is broken, the first AV to stop performing all of the perception tasks and all of the planning tasks for the second AV; and triggering the second AV to revert to performing all of its own respective perception functions and all of its own planning functions.

16. The non-transitory computer-readable storage medium of claim 15, wherein the clustering arrangement is configured to persist for at least a portion of a navigation duration corresponding with the identified route overlap.

17. The non-transitory computer-readable storage medium of claim 15, wherein the clustering instruction is further configured to designate the second AV as a lead vehicle.

18. The non-transitory computer-readable storage medium of claim 15, wherein the clustering instruction is configured to cause the first AV and the second AV to share planning operations.

19. The non-transitory computer-readable storage medium of claim 15, wherein the clustering instruction is based on historic ride data.

20. The non-transitory computer-readable storage medium of claim 15, wherein the instructions are further configured to cause the one or more processors to perform operations comprising:

polling one or more of the plurality of autonomous vehicles for a clustering intent, and wherein the clustering instruction is based at least in part on the clustering intent.

* * * * *